Patented Oct. 24, 1950

2,526,894

UNITED STATES PATENT OFFICE 2,526,894

CONDENSATION OF THIOPHENES WITH KETONES

Herman Pines and Bruno Kvetinskas, Chicago, Ill., assignors to Universal Oil Products Company, Chicago, Ill., a corporation of Delaware No Drawing. Application June 28, 1947, Serial No. 757,942

5 Claims. (Cl. 260—329)

This invention relates to the catalytic condensation of a thiophene containing a substitutable nuclear hydrogen atom with a ketone. It is more particularly concerned with the reaction of a ketone with a condensable thiophene in the presence of a metal halide-containing condensation catalyst.

In one embodiment our invention relates to a condensation process which comprises reacting a ketone with a thiophene containing a substitutable nuclear hydrogen atom in the presence of a metal halide-containing condensation catalyst at condensation conditions.

In a more specific embodiment our invention relates to a condensation process which comprises reacting a nonolefinic monoketone with a thiophene containing a substitutable nuclear hydrogen atom in the presence of a metal halide-containing condensation catalyst at condensation conditions.

A thiophene which is capable of reacting with a ketone in the presence of a metal halide-containing condensation catalyst, in accordance with our invention, contains at least one hydrogen atom bound to the heterocyclic ring of four carbon atoms and one sulfur atom. The various reactive thiophenes may be represented by the formula:

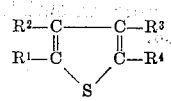

in which at least one of the groups $R^1$, $R^2$, $R^3$, and $R^4$ is a hydrogen atom and the other R groups are selected from the group consisting of hydrogen, alkyl, cycloalkyl, aryl, aralkyl, alkaryl, and naphthyl radicals. Nonhydrocarbon substituents such as a halogen, methoxy, or an alkylthio group may be present provided the thiophene contains at least one substitutable nuclear hydrogen atom.

The ketones that are utilizable in our process may be represented by the formula:

in which R and R' may be selected from the group consisting of alkyl, cycloalkyl, aryl, aralkyl, alkaryl, and naphthyl radicals or a radical in which R and R' are part of the same chain, such as cyclohexanone. The hydrocarbon radicals may be olefinic, but, in general, the nonolefinic types are preferred because the latter result primarily in ketone-type condensations with the thiophenes whereas olefinic ketones give olefin condensations as well. Additionally, monoketones are preferred over polyketones because the product resulting from the condensation of a monoketone and a thiophene usually contains no oxygen whereas the product resulting from the condensation of a polyketone and a thiophene often does.

The catalysts that are utilizable in our process consist of those metal halide-containing substances that catalyze the condensation of ketones with thiophenes containing a substitutable nuclear hydrogen atom. Such catalysts include unmodified metal halides of the Friedel-Crafts type such as aluminum chloride, ferric chloride, stannic chloride, zinc chloride, bismuth chloride, aluminum bromide, and the like; Friedel-Crafts metal halide-hydrocarbon complexes such as are prepared by reacting aluminum chloride with ethylene; Friedel-Crafts metal halides dissolved in a suitable solvent such as stannic chloride dissolved in nitromethane or nitroethane; solid catalysts comprising an active metal halide deposited on a support such as activated charcoal, alumina, fire brick, etc., and addition complexes of alcohols and the like with a Friedel-Crafts metal halide such as aluminum chloride monomethanolate. We mean to have the expression "metal halide-containing condensation catalysts" include condensation catalysts that contain boron trifluoride. One of the better catalysts of this type is boron fluoride-ethyl etherate.

The process of our invention may be carried out in batch operation by placing a quantity of catalyst in a reactor equipped with a stirring device, adding the thiophene, heating or cooling to a reaction temperature, slowly adding the ketone while mixing the contents of the reactor, and recovering the condensation product. However, the preferred method of operation is of the continuous type. If the condensation catalyst is liquid, it is continuously charged to a reactor together with the thiophene and the ketone. The reactor effluent is passed to a settler wherein a separation is effected between the catalyst phase and the thiophene phase and at least a portion of the catalyst phase is continuously recycled to the reaction zone and the thiophene phase is processed for recovery of the desired products. If the catalyst is a solid, it may be disposed as a fixed bed within a reactor and the reactants continuously passed through the bed at condensation conditions. The condensation product in the effluent is recovered and the unreacted materials may be recycled to the reaction zone.

The temperature at which the process of this invention may be conducted will depend to a large extent upon the particular thiophene and ketone being charged to the process and upon the activity of the particular condensation catalyst being employed. With very active catalysts such as unmodified metal halides, temperatures within the range of from about $-20°$ C. to about $40°$ C. should be employed in order to avoid decomposition and other undesirable side reactions. With less active catalysts such as aluminum chloride monomethanolate, higher temperatures may be employed. If the temperature exceeds about $175°$ C., decomposition of the thiophene becomes excessive with nearly all metal halide catalysts.

The pressure should be such that substantially all the reactants are in the liquid phase. In general, these pressures will lie within the range of from about 1 to about 100 atmospheres.

The contact time may be within the range of from about three minutes to about three hours.

The following example is given to illustrate our invention but it is not introduced with the intention of unduly limiting the generally broad scope of said invention.

*Example*

75.6 grams of thiophene and 33.6 grams of stannic chloride were placed in a 250 cc. three-neck alkylation flask that was placed in a water bath. 26.1 grams of acetone was added to the mixture in the flask over a period of 1.3 hours and, after the addition, the contents of the flask were contacted for an additional 0.5 hour. During this time, the temperature was maintained within the range of $15-19°$ C. The reaction was arrested before going to completion by adding water to the reactants. The product was a viscous white oil which, when diluted with ether, formed a white precipitate to the extent of 13 grams. The white solid was insoluble in ether and in acetone but was fairly soluble in benzene and in thiophene. The melting point was $140-150°$ C.; the analysis was C=66.84, H=6.18, and S=27.10. The analysis corresponds closely to a compound that would result from the condensation of 4 molecules of acetone with 5 molecules of thiophene in accordance with the following equation:

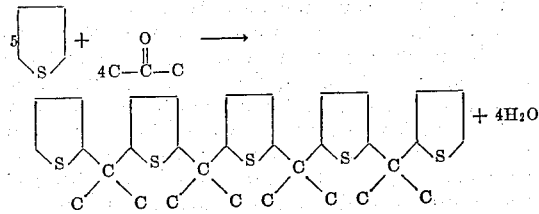

We claim as our invention:

1. A condensation process which comprises reacting a ketone consisting of carbon, hydrogen and oxygen with a thiophene containing a substitutable nuclear hydrogen atom on the thiophene ring in the presence of a Friedel-Crafts metal halide at a temperature from about $-20°$ C. to about $40°$ C.

2. A condensation process which comprises reacting a nonolefinic monoketone consisting of carbon, hydrogen and oxygen with a thiophene containing a substitutable nuclear hydrogen atom on the thiophene ring in the presence of a Friedel-Crafts metal halide at a temperature from about $-20°$ C. to about $40°$ C.

3. A process which comprises reacting a saturated aliphatic monoketone consisting of carbon, hydrogen and oxygen with a thiophene containing a substitutable nuclear hydrogen atom on the thiophene ring in the presence of a Friedel-Crafts metal halide at a temperature from about $-20°$ C. to about $40°$ C.

4. A condensation process which comprises reacting an aromatic monoketone consisting of carbon, hydrogen and oxygen with a thiophene containing a substitutable nuclear hydrogen atom on the thiophene ring in the presence of a Friedel-Crafts metal halide at a temperature from about $-20°$ C. to about $40°$ C.

5. A condensation process which comprises reacting acetone with thiophene in the presence of stannic chloride at a temperature from about $-20°$ C. to about $40°$ C.

HERMAN PINES.
BRUNO KVETINSKAS.

REFERENCES CITED

The following references are of record in the file of this patent:

UNITED STATES PATENTS

| Number | Name | Date |
|---|---|---|
| 2,410,553 | Schmerling | Nov. 5, 1946 |

OTHER REFERENCES

Bernthsen and Sudborough "Organic Chemistry," Van Nostrand, N. Y. 1925 (1922 edition) page 549.

Richter, "Organic Chemistry," pp. 649, 650, Wiley, N.Y., 1938.